Figure 1:
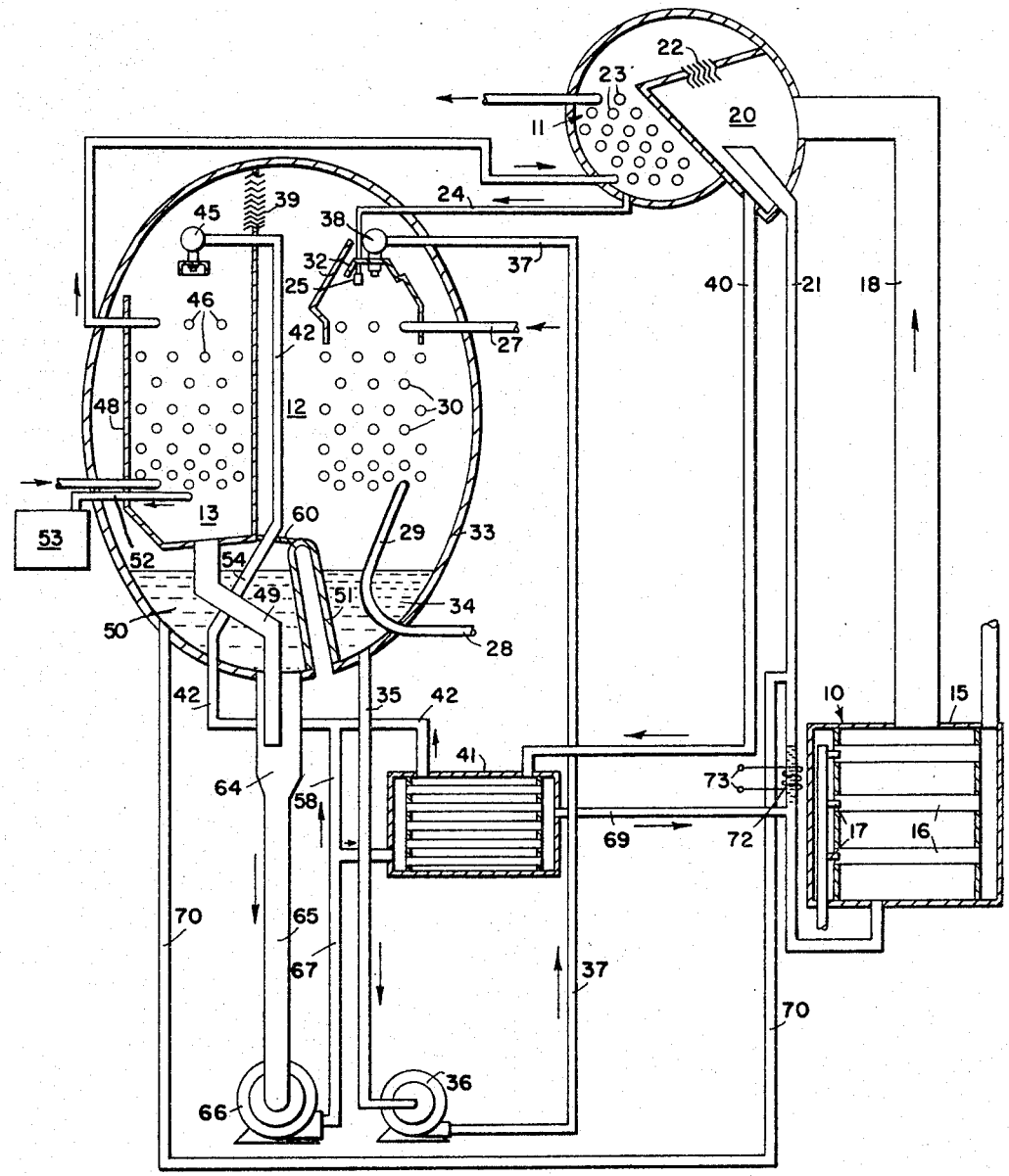

Oct. 4, 1966

J. R. BOURNE ET AL 3,276,217

MAINTAINING THE EFFECTIVENESS OF AN ADDITIVE
IN ABSORPTION REFRIGERATION SYSTEMS

Filed June 29, 1964

2 Sheets-Sheet 1

INVENTORS.
JOSEPH R. BOURNE.
KEITH V. EISBERG.

BY
*Frank N. Decker jr.*

ATTORNEY.

3,276,217
MAINTAINING THE EFFECTIVENESS OF AN ADDITIVE IN ABSORPTION REFRIGERATION SYSTEMS
Joseph R. Bourne, Dewitt, and Keith V. Eisberg, Syracuse, N.Y., assignors to Carrier Corporation, Syracuse, N.Y., a corporation of Delaware
Filed June 29, 1964, Ser. No. 378,854
16 Claims. (Cl. 62—101)

This invention relates to absorption refrigeration machines, and more particularly, to absorption refrigeration machines of the type employing an additive, such as octyl alcohol, in the refrigeration machine.

It is known to those skilled in the art of absorption refrigeration that the addition of certain additives, such as octyl alcohol (2 ethyl-n-hexanol), in an absorption refrigeration machine of the type employing water as a refrigerant and an aqueous solution of lithium bromide as an absorbent produces a substantial increase in the overall capacity of the refrigeration machine.

The addition of the octyl alcohol creates a turbulent film on the exterior of the absorber tubes and it has been suggested that the resulting turbulent film provides better heat transfer than a laminar film on the absorber tubes. In any event, a substantial increase in absorption of refrigerant occurs when octyl alcohol is added to the absorber section of an absorption machine employing a lithium bromide absorbent solution.

It has been observed that the addition of octyl alcohol also appears to improve purging of relatively noncondensible gases from the absorption machine. It is also known that the octyl alcohol results in dropwise condensation of refrigerant vapor on the exterior surfaces of the condenser tubes and thereby results in improved condenser heat transfer.

While the mechanism of these observed phenomena is not entirely understood, some experimental evidence suggests the possibility that a condition for effective increase in capacity of an absorption machine, is the existence of octyl alcohol vapor in the region of the absorber and condenser tubes. However, it has been observed that the effect of the octyl alcohol on the capacity of an absorption machine appears to wear off after a period of time. When octyl alcohol is first added to the absorption machine, there is an immediate drop in chilled water temperature during the period of addition and for a short time thereafter. The chilled water temperature appears to rise shortly after the addition of the octyl alcohol and begins to level off at a temperature which may represent, in a typical machine, roughly a 20% increase in refrigeration capacity. However, over an extended period of time, the observed increase in capacity of the refrigeration machine often appears to gradually diminish. Consequently, it has been a necessary and customary practice for an operator of an absorption machine to periodically add octyl alcohol in order to maintain the increased level of refrigeration capacity.

In accordance with this invention, it has been discovered that one of the reasons for the loss of increased capacity noted after the addition of octyl alcohol to an absorption refrigeration machine is the tendency of the alcohol to settle out in certain locations in the absorption machine where it is not circulated with the absorbent or refrigerant and where it is apparently inhibited from entering into the vapor phase.

Octyl alcohol has only limited solubility in both refrigerant water and in an aqueous lithium bromide solution. While some water and lithium bromide is dissolved in the octyl alcohol, and some octyl alcohol is dissolved in the refrigerant and absorbent solutions, the alcohol will be referred to as existing in a partially undissolved liquid phase in the absorption machine.

Since the specific gravity of octyl alcohol is substantially less than that of either water or the aqueous lithium bromide solution in the refrigeration machine, the octyl alcohol floats on the surface of these liquids. Consequently, the alcohol is not readily entrained or mixed in liquids circulated through the absorption refrigeration machine, and the disparity in their specific gravities further intensifies the problem of accumulation of the alcohol in sumps and other locations in the machine where it does not serve a useful purpose.

Furthermore, a substantial portion of octyl alcohol vapor may condense in the absorber section, in spite of the relatively high temperature encountered therein. It is thought that the partial pressure due to octyl alcohol is relatively high in the lower portion of the absorber tube bundle where very little unabsorbed refrigerant vapor exists. It is suggested that the partial pressure due to octyl alcohol in this region of the absorber is sufficiently high so that the alcohol condenses. In prior absorption refrigeration machines, this condensed or otherwise unvaporized and unabsorbed fraction of octyl alcohol accumulates and builds up at locations at which it is unable to perform its desired function and at which it becomes trapped or is purged from the machine.

In accordance with this invention, it is desired to provide a method and a means for maintaining the effectiveness of octyl alcohol in an absorption refrigeration machine where its presence is effective to increase the capacity of the refrigeration machine.

Accordingly, it is a principal object of this invention to provide an improved absorption refrigeration machine and an improved method of operating an absorption refrigeration machine.

It is a further object of this invention to provide increased effectiveness of an additive in an absorption refrigeration machine.

It is a still further object of this invention to provide an improved means and method for maintaining the effectiveness of an additive in an absorption refrigeration machine.

These and other objects of this invention are achieved in a preferred embodiment thereof by providing means to vaporize an additive, such as octyl alcohol, at locations in an absorption machine at which the additive tends to accumulate, so that the vaporized additive passes to a location in the machine where it is effective to provide the desired result.

More particularly, it has been found that octyl alcohol tends to accumulate in absorbent and refrigerant sumps, including certain solution lines in an absorption machine. According to this invention heat exchange tubes or other heating means are disposed adjacent refrigerant and absorbent sumps or at other desired locations in an absorption refrigeration machine in direct or indirect heat exchange relation with liquid adjacent the surface of the liquid in these sumps. For example, a relatively warm fluid is passed through the heat exchange tubes so that octyl alcohol floating on the surface of the sumps is vaporized and passes in the vapor state to the region of the absorber tubes to provide improved refrigeration capacity.

Furthermore, means is provided to collect and pass absorbent solution and undissolved liquid octyl alcohol, which is not vaporized in the absorber or which is condensed therein, directly into the solution lines for passage to the generator section and for recirculation to the absorber section. Part of the octyl alcohol is passed to the generator and is vaporized therein along with refrigerant and passed to the refrigerant condenser where it promotes dropwise condensation and results in increased heat transfer therein. Part of the octyl alcohol which is recirculated over the absorber tubes is combined with relatively warm strong solution and is flashed in the region of the absorber tubes to improve the rate of absorption in the absorber. Electrical resistance heaters may also be conveniently employed at various locations in an absorption refrigeration machine, such as adjacent solution lines, to prevent the accumulation of octyl alcohol at these locations, if desired.

It has been found that by the practice of this invention the addition of octyl alcohol is effective to continuously provide as much as a 50% increase in refrigeration capacity of a lithium bromide absorption refrigeration machine and that the effect of the alcohol does not diminish over a relatively long period of time compared with previous experience.

Figure 2:
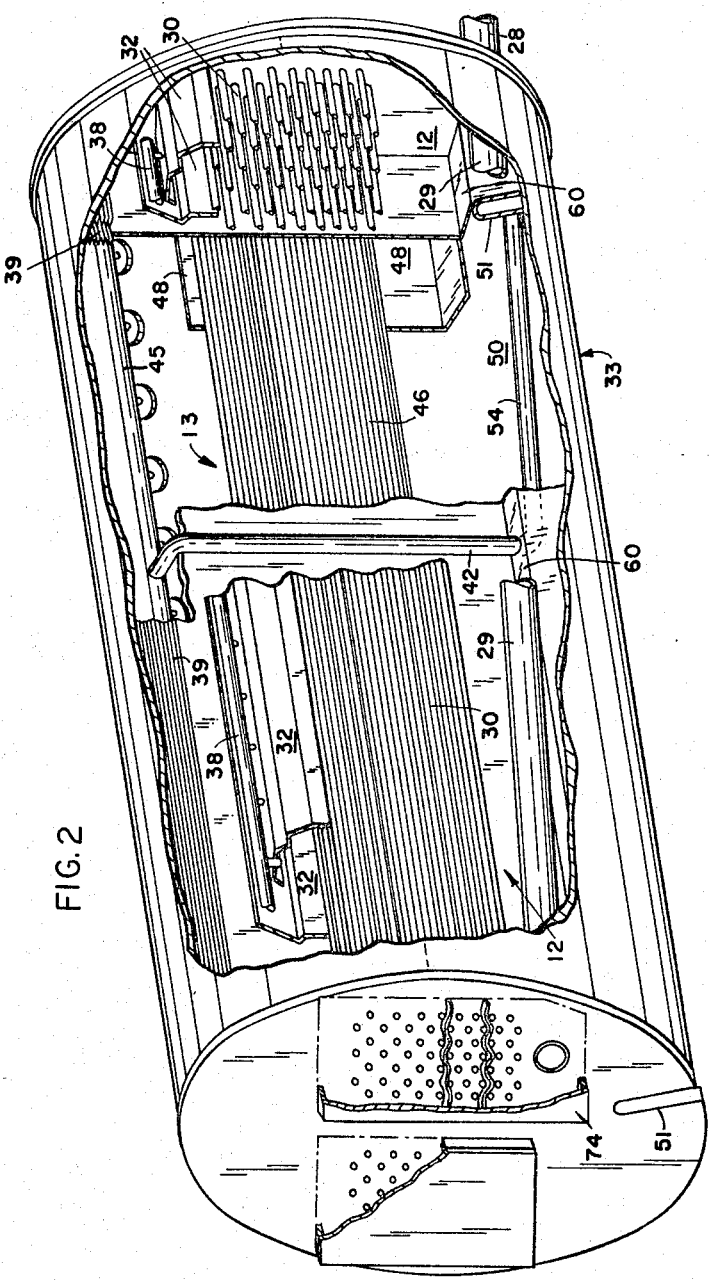

These and other objects of this invention will become more apparent by reference to the following detailed description and the attached drawings wherein:

FIGURE 1 is a diagrammatic view, partly in cross section, of an absorption refrigeration machine embodying the instant invention; and FIGURE 2 is an isometric view, partly broken away, showing one embodiment of an improved absorber and evaporator construction in accordance with this invention.

For purposes of illustration, one embodiment of this invention will be described wherein the absorption refrigeration machine may suitably employ water as the refrigerant and a solution of lithium bromide as the absorbent solution. As used herein, the term "strong solution" refers to a concentrated solution of lithium bromide which is strong in absorbing power; the term "weak solution" refers to a dilute solution of lithium bromide, which is weak in absorbing power. It will be understood that the principles of this invention are applicable to a wide variety of absorption refrigeration machines as well as to machines using other combinations of absorbent and refrigerants.

A suitable additive, such as octyl alcohol (2 ethyl-n-hexanol) is added to increase the refrigeration capacity of the absorption refrigeration machine. Octyl alcohol is relatively light and relatively volatile with respect to, and relatively immiscible with, both the aqueous lithium bromide absorbent solution and the refrigerant water. Consequently, the alcohol floats on the surface of the liquids in the absorption machine. This fraction of liquid octyl alcohol or other additive which floats on the surface of absorbent or refrigerant liquid is referred to herein as undissolved liquid additive. This invention is not limited, however, to the use of octyl alcohol as an additive nor to the use of additives for increasing the refrigeration capacity in a lithium bromide absorption machine, since any relatively volatile additive can be kept in circulation by the practice of this invention.

Referring particularly to FIGURE 1, there is shown an absorption refrigeration machine having a direct fired generator section 10, a condenser section 11, an evaporator section 12, and an absorber section 13, interconnected to provide refrigeration. It is preferred to include the evaporator and absorber sections within a single shell as shown in the drawings, but it will be appreciated that other configurations would be satisfactory and that the machine shown in the drawings is merely illustrative of one embodiment of applicants' invention.

Generator section 10 comprises a shell 15 having a plurality of fire tubes 16 passing therethrough. Gas jets 17 supply an ignited mixture of gas and air into fire tubes 16 to heat weak solution which is supplied to the generator. A vapor lift tube 18 extends from the top of shell 15. Weak solution is heated in generator section 10 to boil off refrigerant vapor and to thereby concentrate the weak solution. A mixture of concentrated absorbent solution and refrigerant rises upwardly through vapor lift tube 18 and passes into separator chamber 20. An equalizer line 21 is provided between the bottom of generator 10 and separator 20 to assist in stabilizing the generator boiling. Octyl alcohol which is passed to the generator with absorbent solution is also vaporized in the generator. Other types of generators, such as steam or hot water heated generators, may be employed, if desired.

Condenser section 11 is conveniently contained in the same shell as separator 20 and comprises a plurality of heat exchange tubes 23. A cooling medium from a suitable source, such as a cooling tower, passes through condenser tubes 23. Refrigerant and octyl alcohol vapor separate from the mixture of absorbent solution passed to separator chamber 20 and pass to condenser section 11 through eliminators 22. The refrigerant vapor and octyl alcohol vapor are both condensed to a liquid in condenser section 11. The presence of octyl alcohol in the condenser in a vapor state results in improved heat transfer taking place in the condenser by promoting dropwise condensation of the refrigerant on the exterior surface of heat exchange tubes 23. Liquid refrigerant and liquid alcohol pass from condenser section 11 through refrigerant condensate line 24 to be distributed over heat exchange tubes 30 in evaporator section 12.

Evaporator section 12 comprises a plurality of heat exchange or evaporator tubes 30 disposed in a tube bundle located in a portion of shell 33. Water or other heat exchange fluid to be cooled is passed through evaporator tubes 30 in heat exchange with refrigerant distributed by spray nozzles 25 over the exterior surfaces thereof. Heat is absorbed from the water passing through evaporator tubes 30, thereby vaporizing refrigerant and alcohol. Alternatively, the alcohol may be flashed in evaporator 12 by admixture with relatively warm refrigerant condensate, prior to the distribution of refrigerant over tubes 30. The vaporized refrigerant and alcohol pass from evaporator section 12 into absorber section 13 carrying the heat absorbed from the water passing through tubes 30. The chilled water may be circulated to suitable remote heat exchangers (not shown) to provide cooling or air conditioning as desired.

Evaporator tubes 30 are arranged in staggered rows such that the tubes of every other row are vertically aligned with each other and the tubes of immediately adjacent rows are disposed out of alignment with the tubes in adjacent rows, as illustrated in the drawing. Suitable baffles 32 may be provided in evaporator section 12 to direct refrigerant from the spray nozzles onto the tube bundle in the evaporator section.

Shell 33 includes an evaporator sump 34 containing unevaporated refrigerant liquid and undissolved octyl alcohol which drips off the lower rows of evaporator tubes 30. A refrigerant recirculation line 35 is connected to receive refrigerant from sump 34. The refrigerant is pumped through refrigerant pump 36 and recirculation line 37 to spray nozzles 38 where it is again discharged over the top of the tube bundle in the evaporator section. A line 27 for entering chilled water, or other heat exchange medium to be cooled, is provided to pass entering water into evaporator tubes 30 and a leaving chilled water line 28 is provided to pass the heat exchange medium which has been cooled in evaporator 12 to a remote location to provide the desired refrigeration.

In accordance with this invention, as best shown in FIGURE 2, a portion 29 of leaving chilled water line 28 is connected in header 74 to the last pass of the heat exchange bundle in the evaporator section, and extends angularly downwardly through substantially the entire longitudinal length of the portion of shell 33 which forms the evaporator section. Portion 29 of line 28 drops sufficiently throughout its length in shell 33 so that some portion of it is normally always disposed below the level of liquid in sump 34.

Some of the octyl alcohol which is condensed in condenser 11 and passed through line 24, with refrigerant condensate, into evaporator section 12 will be immediately flashed upon being discharged in the evaporator section. An additional portion of the undissolved alcohol will be evaporated as it passes over heat exchange tubes 30. The remaining liquid alcohol is collected in sump 34 where it will float on the surface of the liquid refrigerant therein. While the heat exchange medium passed through line 28 has been chilled in evaporator section 12, it is relatively warm compared with the refrigerant in sump 34 and sufficient heat exchange takes place between the portion 29 of line 28 and the liquid adjacent the surface of sump 34 to vaporize the octyl alcohol at the surface of the liquid in the sump and prevent it from accumulating in an excessive quantity in the sump. The vaporized octyl alcohol passes into absorber 13 with the refrigerant vapor evaporated in evaporator 12. The means to vaporize the alcohol may of course be otherwise located so as to be in either direct or indirect heat exchange relation with the liquid at the surface of the sump.

While the leaving chilled heat exchange medium has been shown in the illustrated embodiment as being in heat exchange relation with the liquid adjacent the surface of the liquid in sump 34, it will be understood that the entering heat exchange medium in line 27, which is at a higher temperature than the leaving heat exchange medium, may be passed instead in heat exchange relation with the undissolved additive in sump 34, if desired. Such an arrangement is particularly convenient in the event that the evaporator section is inverted with respect to that shown in the drawing.

Other sources of heat energy may be employed to vaporize accumulated undissolved additive, if desired. For example, a single or multiple tube heat exchanger may be disposed in sump 34 and other relatively warm fluids, such as strong solution from generator 10, or the relatively warm refrigerant condensate from line 24, may be passed in heat exchange relation with the undissolved fraction of the additive in sump 34. Alternatively, an electrical resistance heater or other suitable heating means may be employed to vaporize the additive, if desired.

The rows of evaporator tubes 30 are preferably spaced apart a greater distance near the upper portion of the tube bundle, adjacent which liquid refrigerant enters the tube bundle, than are the rows of tubes in the lower portion of the tube bundle, toward which the liquid refrigerant passes. This may be satisfactorily and conveniently achieved by making the spacing between the evaporator tubes in each horizontal row the same while decreasing the vertical spacing between horizontal rows, and staggering adjacent rows of tubes as shown in the drawing.

As previously explained, absorbent solution is separated from vapor in separation chamber 20. The concentrated, or strong, absorbent solution is passed from the lower portion of chamber 20 through strong solution line 40, through one side of heat exchanger 41, from which it flows through strong solution line 42 and is distributed by spray nozzles 45 over absorber tubes 46 to wet the absorber tubes. The strong solution passing through heat exchanger 41 has very little, if any, alcohol in it.

Absorber section 13 is preferably also contained in shell 33 and comprises a plurality of heat exchange tubes 46 disposed in a tube bundle and arranged in rows of staggered tubes as previously described with respect to the heat exchange tubes in evaporator section 12. Cooling water from a suitable source is passed through heat exchange tubes 46 to cool the absorbent solution sprayed on their exterior surfaces. The cooling water may be circuited so as to flow from absorber heat exchange tubes 46, through condenser tubes 23 to a cooling tower (not shown) where the cooling water is recooled and returned to the absorber tubes.

An absorber pan 48 is arranged around the sides and bottom of the tube bundle in the absorber section to separate absorber section 13 from evaporator section 12 and to prevent absorbent solution from spray nozzles 45 from passing into the evaporator section. Eliminators 39 may or may not be provided in the vapor path between the absorber and evaporator sections. Absorber pan 48 also prevents refrigerant vapor from entering the sides of the tube bundle and confines the vapor flow to the region about the tubes. An absorber discharge conduit 49 passes absorbent solution and octyl alcohol which is collected by pan 48 and discharges it directly into outlet 64 of solution storage sump 50, which is formed in the lower portion of the absorber section of shell 33 by a partition 51. Sump 50 serves to store excess absorbent solution received from absorber 13 at times when excess solution storage is required. Consequently, the level of solution in sump 50 varies from time to time.

A purge line 52 having an opening adjacent the lower portion of the tube bundle in absorber section 13 is connected to a suitable purge unit 53. Purge unit 53 may be a jet purge of the general type shown in Leonard Patent 2,940,273, granted June 14, 1960, or it may be a vacuum pump type, or any other suitable type of purge.

As best shown in FIGURE 2, line 42 includes a portion 54 which extends gradually upwardly from the bottom of sump 50 to the upper portion of the sump so that the surface of liquid in the sump is normally in contact with the exterior of portion 54 irrespective of the level of solution in the sump. Line 42 passes strong solution from generator 10 and separator 20 to absorber 13. While the strong solution passing through portion 54 of line 42 has been cooled in heat exchanger 41, it is still relatively warm with respect to the temperature of solution in sump 50. Consequently, the relatively warm strong solution passing through portion 54 of line 42 is passed in heat exchange relation with the liquid adjacent the surface of liquid in sump 50 to vaporize alcohol therein. While it is preferred to locate the alcohol boiler in the manner shown, it will be understood that the means to vaporize alcohol may be placed in other locations.

As previously explained, octyl alcohol vapor passes into absorber 13 from evaporator 12. Unabsorbed liquid octyl alcohol may also pass with absorbent solution into absorber 13 through lines 64, 67, 58 and 42 and be discharged into the absorber from spray header 45 in the event that line 58 is provided for recirculation of absorbent solution. A portion of the liquid alcohol passing through spray header 45 is flashed due to the heat absorbed by admixture with relatively warm solution from the generator. Some alcohol vapor is condensed in absorber 13 during its passage, with absorbent solution, over heat exchange tubes 46. The remaining unvaporized octyl alcohol and the condensed octyl alcohol are collected at the bottom of the absorber by absorber pan 48 and discharged through line 49, through outlet 64, directly into the suction line 65 of pump 66. Therefore, the undissolved alcohol collected in pan 48 is normally bypassed around sump 50 by its passage through line 49 so that the tendency of the alcohol to separate from the absorbent solution and be stored in sump 50 is inhibited and circulation of the alcohol in the machine is facilitated. This alcohol is either forwarded to the generator, in which case it passes to the condenser and then to the absorber, through the evaporator, or it is directly recirculated into the absorber by passage to spray header 45. By this means, the alcohol is effectively kept in circulation so that it is continuously supplied to the region of the tube bundle within absorber pan 48.

Absorbent solution storage sump 50 may be in vapor communication with the tube bundle in the absorber section. Consequently, octyl alcohol accumulated in absorbent solution storage sump 50 may be vaporized by heat exchange with the solution passing through portion 54 of line 42. The vaporized alcohol passes from sump 50 into the interior of absorber pan 48 where it is effective in increasing the refrigeration capacity of the refrigeration machine. It will be appreciated that, as previously described, other heating means for vaporizing the additive in sump 50 may be employed, if desired. Also, other means for returning the vaporized alcohol to a desired location from sump 50 may be employed.

Heat exchange tubes 46 are preferably disposed, as shown in FIGURES 1 and 2, in the absorber tube bundle in a plurality of horizontal rows of equally spaced tubes. Immediately adjacent horizontal rows have the tubes therein arranged in staggered relation with each other. The absorber tubes in each row are preferably equally spaced from each other so that the tubes in every other row are in vertical alignment with each other. In this manner, wetting of the absorber tubes in the tube bundle is enhanced by dripping of absorbent solution from the tubes in one row onto the tubes in the second row therebelow. The horizontal rows are vertically spaced apart from each other by a progressively decreasing distance from the upper row, wherein refrigerant vapor enters the absorber tube bundle, toward the lower rows, to which the refrigerant vapor flows.

A baffle 60 is provided between absorber pan 48 and evaporator section 12 to prevent refrigerant draining into the absorber section. Absorbent solution is withdrawn from the absorber section through weak solution line 65 and passed by pump 66 through line 67, through the other side of heat exchanger 41 and line 69 to equalizer line 21 where it is forwarded to the generator section for reconcentration. A portion of the weak solution from pump 66 may be passed through weak solution recirculating line 58 so as to mix with concentrated absorbent solution in line 42 and recirculation through spray nozzles 45.

A solution loop line 70 may be provided between equalizer line 21 and the lower portion of absorbent sump 50. Line 70 serves to maintain a desired solution level in generator section 10 on startup.

Because of the communication afforded between line 70 and absorber 13, it is possible that line 21 forms a sump and some octyl alcohol may be stored in this line during some conditions of operation of the absorption refrigeration machine. If desired, a suitable electrical resistance heater 72, connected to a source of alternating current 73, may be disposed adjacent the level of liquid 40 in line 21 to vaporize octyl alcohol trapped therein. The vaporized octyl alcohol passes upwardly through line 21 and eliminators 22 into condenser 11 where it is condensed along with alcohol vaporized in generator 10. Other means to supply heat to the sump formed by line 21 may also be employed, if desired, such as by running the line in heat exchange relation with generator 10 or other sources of heat. It will be appreciated that other locations in the absorption refrigeration machine, at which additive tends to accumulate, may be similarly provided with means to vaporize the additive in order to retain its effectiveness in improving the refrigeration capacity of the machine.

The principles of this invention may be applied to absorption refrigeration machines of other types than that described, and to other locations in absorption refrigeration machines where it is desired to prevent any relatively volatile additive from accumulating in excessive amounts. It has been found that by applying the principles of this invention, octyl alcohol is enabled to be more effective in increasing the refrigeration capacity of an absorption machine and that its effectiveness is greatly prolonged. It will be understood that other additives may be employed in accordance with this invention and that the invention is not limited to additives for increasing the refrigeration capacity of the system. Also, by suitable modifications such as relocation of the vaporizing means, this invention may be applied to additives having higher specific gravity than the refrigerant or absorbent solutions.

We claim:

1. An absorption refrigeration machine adapted to contain a refrigerant, an absorbent solution, and an undissolved liquid fraction of a relatively volatile additive, comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; said refrigeration machine having a location therein where undissolved additive tends to be accumulated; and means to supply sufficient heat to said location to vaporize undissolved additive accumulated therein so that the vaporized additive is enabled to pass to another location in said absorption refrigeration machine.

2. An absorption refrigeration machine adapted to contain a refrigerant, an absorbent solution, and an undissolved liquid fraction of a relatively volatile additive, comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; a sump having a quantity of absorbent solution therein; said additive having a specific gravity less than that of said absorbent solution and tending to accumulate adjacent the surface of liquid in said sump; and means to supply heat adjacent the surface of liquid in said sump to vaporize additive accumulated therein so that the vaporized additive is enabled to pass out of said sump.

3. An absorption refrigeration machine as defined in claim 2 wherein said means to supply heat to said sump comprises an electrical resistance heater disposed in heat exchange relation with accumulated undissolved additive therein.

4. An absorption refrigeration machine as defined in claim 2 wherein said means to supply heat to said sump comprises passage means extending through said sump for passing a relatively warm fluid in heat exchange relation with accumulated undissolved additive in said sump.

5. An absorption refrigeration machine as defined in claim 2 wherein said means to supply heat to said sump comprises passage means for carrying a relatively warm fluid, said passage means extending longitudinally and angularly through said sump, from a lower region of said sump to a region thereof in which the passage means are disposed in heat exchange relation with undissolved liquid additive adjacent the surface of liquid in said sump, substantially irrespective of the level of liquid in said sump.

6. An absorption refrigeration machine adapted to contain a refrigerant, an absorbent solution, and an undissolved relatively volatile liquid additive comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; a sump adapted to contain absorbent solution; and passage means extending through said sump, said passage means being connected to pass relatively warm absorbent solution from said generator section in heat exchange relation with liquid in said sump prior to discharge of said absorbent solution into said absorber section thereby vaporizing undissolved additive accumulated in said sump.

7. An absorption refrigeration machine adapted to contain a refrigerant, an absorbent solution, and an undissolved, relatively volatile, liquid additive, comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; a sump adapted to contain liquid refrigerant; and passage means for passing a heat exchange medium through said evaporator for chilling said heat exchange medium and through said sump in heat exchange relation with liquid in said sump to vaporize undissolved additive accumulated in said sump.

8. An absorption refrigeration machine adapted to contain a refrigerant, an absorbent solution, and an undissolved liquid fraction of an additive effective to increase the refrigeration capacity of said machine, comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; said additive being relatively volatile and having a lower specific gravity than said absorbent solution; passage means to pass absorbent solution through said machine; said absorber section including a tube bundle, means to discharge absorbent solution onto said tube bundle; collector means to collect liquid additive and absorbent solution from said absorber section; sump means to store absorbent solution, said sump means being arranged to receive absorbent solution from said absorber section; and conduit means, substantially bypassing said sump, to pass liquid additive collected by said collector means directly to said passage means so that accumulation in said sump of undissolved liquid additive collected by said collector means is inhibited by facilitating the direct passage of the collected additive through said refrigeration machine.

9. An absorption refrigeration machine as defined in claim 8 wherein said passage means to pass absorbent solution through said machine includes a pump, and said unabsorbed additive is discharged by said conduit means from said collector means directly into the suction line of said pump to circulate said alcohol through said refrigeration machine.

10. An absorption refrigeration machine as defined in claim 8 including means to supply heat to said sump adjacent the level of liquid therein to vaporize undissolved additive accumulated in said sump to enable passage of vaporized additive from said sump.

11. An absorption refrigeration machine adapted to contain a refrigerant, an absorbent solution, and an undissolved liquid fraction of an additive effective to increase the refrigeration capacity of said machine, comprising an evaporator section for evaporating liquid refrigerant vapor to provide cooling, an absorber section for absorbing refrigerant vapor into an absorbent solution, a generator section for heating absorbent solution to concentrate said absorbent solution by vaporizing refrigerant therefrom, a condenser section for liquefying refrigerant vaporized in said generator, said sections being connected to provide refrigeration; said additive being relatively volatile, and having a lower specific gravity than said absorbent solution; said absorber section including a tube bundle; means to discharge absorbent solution onto said absorber tube bundle; an absorber pan extending about a plurality of sides of said absorber tube bundle to collect liquid additive and absorbent solution from said absorber section; a solution storage sump for storing absorbent solution; vapor passage means placing said solution storage sump in vapor communication with said absorber tube bundle; passage means bypassing said sump to pass liquid additive and absorbent solution from said absorber pan for direct circulation in said refrigeration machine so that passage of unabsorbed additive collected in said absorber pan through said machine is facilitated thereby inhibiting accumulation of undissolved additive in said sump; and passage means extending through said absorber sump to pass relatively warm absorbent solution from said generator through said absorber sump in heat exchange relation with liquid adjacent the surface of the liquid in said sump to vaporize additive in said sump to pass vaporized additive from said sump into said absorber pan through said vapor passage means.

12. A method of operating an absorption refrigeration machine which includes an absorber section, an evaporator section, a generator section and a consenser section connected to provide refrigeration, wherein said machine contains an absorbent solution, a refrigerant, and a partially undissolved, relatively volatile, liquid additive which comprises the steps of passing absorbent solution and refrigerant through said machine to produce refrigeration; collecting undissolved liquid additive in a region of said refrigeration machine; and supplying heat to said region to vaporize undissolved liquid additive accumulated in said region so that said vaporized additive is enabled to pass from said region to another region of said refrigeration machine.

13. A method of operating an absorption refrigeration machine including an absorber section having an absorber tube bundle, an evaporator section, a condenser section and a generator section connected to provide refrigeration, wherein said refrigeration machine contains an absorbent solution, a refrigerant, and a partially undissolved, relatively volatile, liquid additive which comprises the steps of distributing absorbent solution onto the absorber tube bundle; collecting absorbent solution in an absorbent storage sump; and heating the liquid in said absorbent storage sump to vaporize undissolved additive therein to enable passage of the vaporized undissolved additive from said sump to a desired location in said refrigeration machine.

14. A method of operating an absorption refrigeration machine comprising an absorber section having an absorber tube bundle, an evaporator section, a condenser section and a generator section connected to provide refrigeration, wherein said refrigeration machine contains an absorbent solution, a refrigerant, and a partially undissolved, relatively volatile, liquid additive to increase the refrigeration capacity of said machine, which comprises the steps of distributing absorbent solution onto the absorber tube bundle, collecting absorbent solution distributed over said absorber tube bundle in a storage sump; and passing relatively warm absorbent solution from said generator section in heat exchange relation with liquid collected in said sump prior to the discharge of said relatively warm absorbent solution into said absorber section to vaporize undissolved liquid additive accumulated in said sump.

15. A method of operating an absorption refrigeration machine comprising an absorber section, an evaporator section having a tube bundle, a condenser section and a generator section connected to provide refrigeration, wherein said refrigeration machine contains an absorbent solution, a refrigerant, and a partially undissolved, relatively volatile, liquid additive to increase the refrigeration capacity of said machine, which comprises the steps of discharging refrigerant onto the tube bundle in said evaporator section; collecting the discharged refrigerant in a sump; and passing a heat exchange medium through said tube bundle in said evaporator to cool said heat exchange medium and in heat exchange relation with liquid in said sump to vaporize undissolved liquid additive accumulated in said sump.

16. A method of operating an absorption refrigeration machine including an absorber section having a tube bundle, an evaporator section, a condenser section and a generator section connected to provide refrigeration, wherein said refrigeration machine contains an absorbent solution, a refrigerant, and a partially undissolved, relatively volatile, liquid additive to increase the refrigeration capacity of said machine, which comprises the steps of discharging absorbent solution onto said absorber tube bundle, collecting absorbent solution and liquid additive from said absorber section; storing absorbent solution in a sump; passing collected absorbent solution around said sump directly to a desired location in said refrigeration machine; heating the liquid in said sump to vaporize liquid additive therein; and passing said vaporized additive from said sump to a desired location in said refrigeration machine.

References Cited by the Examiner

UNITED STATES PATENTS

| | | | |
|---|---|---|---|
| 3,081,605 | 3/1963 | Leonard | 62—112 X |
| 3,167,927 | 2/1965 | Lynch et al. | 62—101 X |
| 3,200,604 | 8/1965 | Greeley et al. | 62—476 X |

LLOYD L. KING, *Primary Examiner.*